3,564,043
HALOGENATED CARBAMATE
ANTISTATIC AGENTS
Fred S. Eiseman, Jr., Maplewood, and Leslie M. Schenck, Mountainside, N.J., assignors to GAF Corporation, New York, N.Y., a corporation of Delaware
No Drawing. Filed June 17, 1968, Ser. No. 737,312
Int. Cl. C07c 125/06
U.S. Cl. 260—482   7 Claims

ABSTRACT OF THE DISCLOSURE

Antistatic agents of the formula:

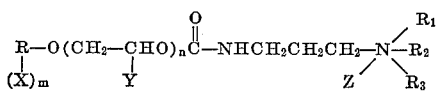

wherein R represents alkyl, aryl or alkaryl radicals containing from 2 to about 18 carbon atoms, X represents halogen substituents such as chloro, bromo, fluoro, $m$ represents an integer of from 1 to 37, Y represents hydrogen, methyl or ethyl, $n$ represents an average value of from 1 to 10, $R_1$ and $R_2$ are members of the group consisting of alkyl and hydroxyalkyl radicals having from 1 to 3 carbon atoms and $R_3$ is a hydroxyalkyl radical of from 1 to 4 carbon atoms and Z is an anion, said antistatic agent being prepared by the condensation of halogen substituted alkyl, aryl and alkaryl polyethyleneoxy chlorocarbonate with a substituted alkyl diamine with subsequent acidification and alkoxylation so as to produce the desired antistatic agent.

---

The present invention relates to new and useful compositions of matter which function as antistatic agents when coated on synthetic and natural fibers, e.g., polyester fibers, acetate rayons, wool, polyolefins and the like, and to the method for their preparation. More particularly, the present invention relates to substituted carbamates exhibiting antistatic properties which are prepared by the condensation of alkyl and aryl polyalkyleneoxy chlorocarbonates with a substituted alkyl diamine followed by acidification and alkoxylation.

The commercial importance of the synthetic fiber industry has greatly emphasized the importance of antistatic agents and finishes since syntheic fibers, e.g., polyester fibers, acrylics, vinyls, etc., are notorious static electricity generators. While other fibers, e.g., cotton or viscose, do not generate the static electricity to any great extent under normal humidity conditions, and fibers such as acetate, rayon, and wool are only moderate generators, necessitating only some precautionary measures in the processing mill, e.g., a controlled high humidity, synthetic fibers such as mentioned above are not easily treated to control static electricity buildup.

While several non-durable finishes have been proposed which are moderately effective in eliminating static buildup on these synthetic fibers, few have been proposed which are completely satisfactory durable antistats. Most finishes employed to eliminate static buildup on synthetic fibers fall into the category of true surfactants although there is no really distinct similarity or correlation between surface activity and antistatic action.

In general, antistatic agents function in two ways, both of which improve the electrical conductivity of the fiber surface. Such antistatic agents are either reasonably good conductors of electricity themselves, or they are hygroscopic and help concentrate atmospheric moisture on the fibers.

The majority of antistatic agents fall into one of the following three catagories: (1) polyhydroxy and polyethylenoxy non-ionic compounds; (2) cationic, or neutral nitrogenous compounds with a hydrophobic moiety in their structure; (3) long-chain phosphates, phosphonates, or other oxygenated phosphorus derivatives. Additional types include sulfonated oils and ester emulsions, and other fiber lubricant emulsions which depend on the particular emulsifying agent used for their antistatic effect.

Long chain quaternary ammonium salts have a marked antistatic action and are widely used in this capacity. These quaternaries, in common with numerous antistatic finishes, are frequently used in combination with auxiliary agents which may themselves be antistats, or serve the secondary purpose of binding the finish to the fiber, as disclosed in U.S. 2,463,282. The water-insoluble salts of higher amines, together with polystyrene sulfonates, are described in U.S. 2,700,001 as nylon antistats. The use of phosphorus compounds in antistatic capacities is given in U.S. 2,575,382; 2,575,399; and 2,676,122. Hygroscopic salts, such as cyclohexylamine lactate, are disclosed in German Pat. 840,694, while the use of polyethoxylated fatty acids and alcohols as antistatic agents for polypropylenes as well as fibers, is reported in U.S. 2,525,691.

In accordance with the present invention, it has now been found that certain compounds which incorporate a carbamate structure within the molecule, and more specifically, those derived from the chlorocarbonate of an alkoxylated halogenated primary or secondary alcohol, or halogenated alkylphenol, and a dialkylaminopropylamine, show excellent antistatic properties when applied to synthetic fibers. These novel carbamates impart not only the antistatic activity associated with both an amide linkage and that imparted by a quaternary configuration, but also the desirable antistat characteristics of a polyalkoxylated hydrophobe. Unexpectedly the combination of these chemical functions within the carbamate molecular structure provides an enhancement lacking through the simple admixture of non-ionic and amide type antistatic agents.

It is, therefore, a principal object of the present invention to prepare new and useful substituted carbamate antistatic agents.

A further object of the present invention comprises antistatic agents of enhanced effectiveness, which antistatic agents contain an amide linkage and a polyalkoxylated hydrophobe.

Yet a further object of the present invention comprises new and useful substituted carbamate antistatic agents derived from the chlorocarbonate of a halogenated alkoxylated primary or secondary alcohol or halogenated alkylphenol and a substituted alkyl diamine.

Still a further object of the present invention comprises a process for preparing new and useful antistatic agents, which process comprises condensing a halogenated alkyl or halogenated aryl polyalkylenoxy chlorocarbonate with an alkyl diamine followed by acidification and alkoxylation.

Still further objects of the present invention will become more apparent from the following more detailed description of the invention.

The new and useful antistatic agents of the present intion correspond to the general formula:

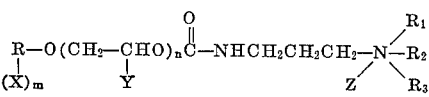

wherein R is a halogen-substituted alkyl, aryl, or alkaryl radical with from 2 to about 18 carbon atoms, X is selected from the group consisting of chlorine, bromine and fluorine atoms, $m$ is an integer representing the number of halogen substituents on the carbon atoms of R, i.e. is an integer of from 1 to 37, Y is a hydrogen, methyl, or ethyl radical, $n$ has an average value of from 1 to 10, $R_1$ and $R_2$ are alkyl or hydroxyalkyl radicals of 1–3 carbon atoms, $R_3$ is a hydroxyalkyl radical of from 1–4 carbon atoms, and Z is an anion. Exemplary radicals for R include, but are not limited to, the following alkyl, aryl and alkaryl radicals:

Ethyl, propyl, butyl, pentyl, hexyl, heptyl, octyl, nonyl, decyl, undecyl, dodecyl, tridecyl, hexadecyl, octadecyl, methylphenyl, ethylphenyl, butylphenyl, hexylphenyl, octylphenyl, nonylphenyl, decylphenyl, dodecylphenyl, pentadecylphenyl, octadecylphenyl, nonadecylphenyl, and phenyl.

Exemplary alkyl and hydroxyalkyl radicals for $R_1$ and $R_2$ include:

Methyl, ethyl, propyl, isopropyl, hydroxymethyl, hydroxyethyl, hydroxypropyl, and dihydroxypropyl, etc.

Exemplary hydroxyalkyl radicals for $R_3$ include:

Hydroxymethyl, hydroxyethyl, hydroxypropyl, hydroxybutyl, dihydroxypropyl, and dihydroxybutyl, etc.

Exemplary anions for Z include:

Halides—chloride, bromide, iodide; phosphate; nitrates; sulfates; and the like.

The new and useful antistatic agents of the present invention are prepared by condensing a halogenated alkyl, a halogenated aryl, or a halogenated alkaryl polyalkylenoxy chlorocarbonate with a substituted alkyldiamine followed by acidification and alkoxylation.

The halogenated alkyl, halogenated aryl, or halogenated alkaryl polyalkylenoxy chlorocarbonate is prepared by reacting phosgene with a halogenated polyalkyleneoxylated aliphatic alcohol phenol or alkylphenol under ambient conditions, in accordance with the following reaction:

$$\underset{(X)_m \quad Y}{RO(CH_2CHO)_nH} + COCl_2 \longrightarrow \underset{(X)_n \quad (Y)}{RO(CH_2CHO)_nCOCl} + HCl$$

In general, a substantially equivalent amount of the reactants is employed and the reaction is carried out by bubbling phosgene under the surface of the halogenated polyalkyleneoxylated aliphatic alcohols, phenol or alkylphenol until substantially all of the hydroxyl content of the reactants is converted into the chlorocarbonate as determined by infrared analysis or other suitable means.

The halogenated polyalkyleneoxylated aliphatic alcohol, phenol or alkylphenol is prepared by any conventional procedure so as to incorporate 1 to 10 moles of alkylene oxide, e.g., ethylene oxide, propylene oxide, or butylene oxide per mole of aliphatic alcohol or alkylphenol. The alkyl or alkaryl polyalkyleneoxy chlorocarbonate prepared in Reaction I is further reacted with a substantially equivalent amount of gamma dialkyl or dialkanol aminopropylamine to produce a substituted amide in accordance with the following reaction:

(II)

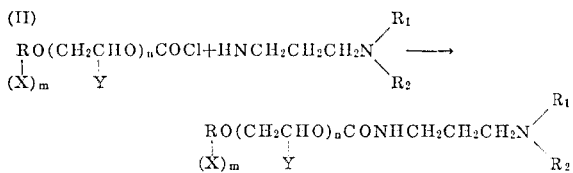

The substituted amide produced in Reaction II is quaternized by reaction with an alkylene oxide or hydroxy-substituted alkylene oxide in the presence of an inorganic acid. Such a reaction is represented as follows:

(III)

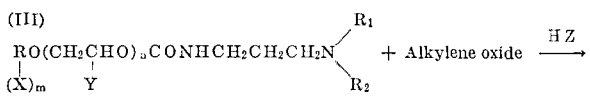

Reaction III above can be more precisely broken down into two separate reactions as follows:

(IIIa)

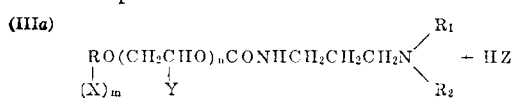

(IIIb)

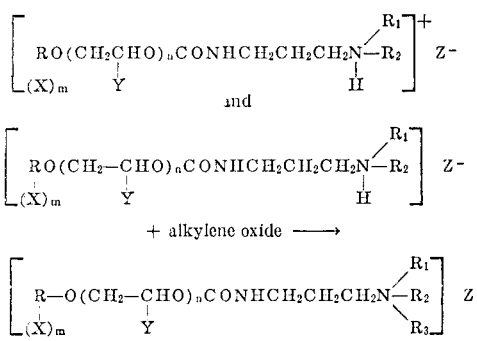

In the above reactions R, $R_1$, $R_2$, $R_3$, X, Y, Z, $m$, and $n$ are as previously defined.

In the preferred synthesis, a trifluoroethanol is reacted with an alkylene oxide using an alkaline catalyst at 120–150° C. and 1–30 p.s.i.g. until one to 10 moles of the oxide is added. In place of the alkaline catalyst, acidic catalysts such as $BF_3$, $H_3PO_3$ and the like can be used. Secondary alcohols such as 1,3-dichloro-2-propanol, 1-bromo-2-propanol, 1-fluoro-6-hexadecanol and the like or their admixtures as well as halogenated phenols such as 4-bromophenol, 2,4-dichlorophenol and halogenated alkylphenols such as 4-octyl-2-chlorophenol 2-decyl-4-bromophenol, etc. can be substituted for the halogenated aliphatic alcohol. The resultant halogenated alkyl or alkylarylpolyalkyleneoxyalkanol is then reacted with phosgene to form the corresponding alkyl or alkylarylpolyalkyleneoxy chlorocarbonate, and the latter compound converted to its carbamate by reaction with gamma dialkylaminopropylamine. This latter derivative is acidified and reacted with an alkylene oxide to form its quaternary ammonium salt.

The new and useful antistatic agents of the present invention have been found to have unexpectedly advantageous antistatic properties, particularly when applied to synthetic fibers, such as polyesters, acrylics, polyolefins, polyamides, etc. Such antistatic agents have been found to reduce and maintain the electrostatic charges for extended periods of time below a potential of 3 kilovolts.

The present invention will now be described by reference to the following specific examples. Such examples are presented for purposes of illustration only, and the present invention is in no way to be deemed as limited thereto.

EXAMPLE 1

(a) To a round bottom flask was charged a total of 245 parts by weight of an ethoxylate (av. app. 3 moles E. O.) of trifluoroethanol. The ethoxylate was agitated at ambient temperature (20–30° C.) while phosgene was bubbled in under the surface for about 1.5 to 2.0 hours. Addition of phosgene was continued until examination of sample on IR showed essentially all absorption due to the hydroxyl group was eliminated.

(b) To a beaker equipped with agitator, two dropping funnels, thermometer and a pH meter were charged 400 ml. water and 92 gms. dimethyl propylene diamine (0.9 mole). These materials were agitated at room temperature while 278 gm. of the chlorocarbonate (0.9 mol) prepared in (a) and 30% NaOH were dropped in simultaneously over about 1 to 1.5 hours at such a rate as to

maintain the pH between 10.0 to 10.5. A total of 138 gm. 30% NaOH was required. After all reactants were added the batch was agitated 15 minutes at room temperature and then brought to pH 9.0 with CP HCl. A total of 25 gm. were required. The product was then stripped of water at 40 mm. pressure and the residue was filtered. The yield was 257 gm. Theoretical yield was 0.9×374=336 gm. so the percent yield was 76.5.

(c) To a 1 liter 4 necked flask with joints clamped for slight pressure were charged 224 gm. (0.6 mol) of the above carbamate, 200 ml. H₂O and 89 gm. CP HCl to bring pH to 3.0 to 3.5. Materials were agitated at 50–60° C. and purged with N₂. Ethylene oxide (30 gm. from cylinder) were added. A total of 20 gm. were absorbed.

The product was stripped to 110° C. pot temperature under line vacuum and then filtered. The weight of the final product was 155 gm.

Percent nitrogen=5.8; theory=6.2.

The product generally corresponds to the formula:

(I)

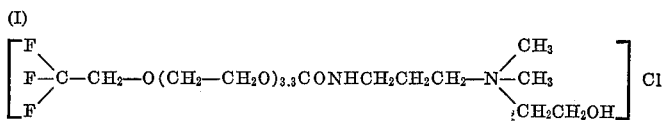

(d) The quaternary formed above was applied from MeOH/CCl₄(520 ml./1000 ml.) solvent mixture to Orlon and polypropylene swatches at 2.50% application rate according to AATCC Standard Test Method 76–1959.

The swatches were conditioned at 72° F. and 50% relative humidity for at least 24 hours and the resistivity measured. Results were as follows:

| | Log ohms/square | |
|---|---|---|
| | Orlon | Polypropylene |
| Control | 14.24 | 14.64 |
| Quaternary carbamate | 8.08 | 8.92 |

EXAMPLE 2

(a) To a round bottom flask was charged a total of 305 parts by weight of an ethoxylate (av. app. 4.0 moles E.O.) of 1,3-dichloro-2-propanol. The ethoxylate was agitated at ambient temperature (20–30° C.) while phosgene was bubbled in under the surface over about 1.5 to 2.0 hours. Addition of phosgene was continued until examination of sample on IR showed essentially all absorption due to the hydroxyl group was eliminated.

(b) To a beaker equipped with agitator, two dropping funnels, thermometer and a pH meter were charged 200 ml. water and 51 gm. dimethyl propylene diamine (0.5 mole). These materials were agitated at room temperature while 183 gm. of the chlorocarbonate (0.5 mol) prepared in (a) and 30% NaOH were dropped in simultaneously over about 1 to 1.5 hours at such a rate as to maintain the pH between 10.0 to 10.5. A total of 75 gm. 30% NaOH was required. After all reactants were added the batch was agitated 15 minutes at room temperature and then brought to pH 9.0 with CP HCl. A total of 9 gm. were required. The product was then stripped of water at 40 mm. pressure and the residue was filtered. The yield was 188 gm. representing 87% of the theoretical.

(c) To a 1 liter 4 necked flask with joints clamped for slight pressure were charged 108 gm. (0.25 mol) of the above carbamate, 100 ml. H₂O and 30 gm. of 85% phosphonic acid to bring pH to 3.0 to 3.5. Materials were agitated at 50–60° C. and purged with N₂. Ethylene oxide was added. A total of 12 gm. were absorbed.

The product was stripped to 110° C. pot temperature under line vacuum and then filtered. The weight of the final product was 148 gm.

Percent nitrogen=4.6; theory=4.9.

The product generally corresponds to the formula:

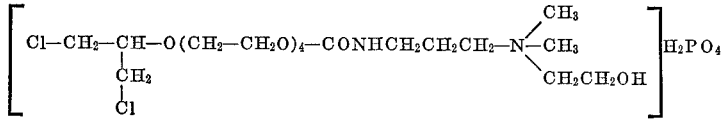

(d) The quaternary formed above was applied from MeOH/CCl₄ (520 ml./1000 ml.) solvent mixture to Orlon and polypropylene swatches at 2.50% application rate according to AATCC Standard Test Method 76–1959.

The swatches were conditioned at 72° F. and 50% relative humidity for at least 24 hours and the resistivity measured. Results were as follows:

| | Log ohms/square | |
|---|---|---|
| | Orlon | Polypropylene |
| Control | 14.24 | 14.64 |
| Quaternary Carbamate | 9.30 | 8.87 |

EXAMPLE 3

(a) To a round bottom flask was charged a total of 306 parts by weight of an ethoxylate (av. app. 2.0 moles E.O.) of 2,3-dibromopropanol. The ethoxylate was agitated at ambient temperature (20–30° C.) while phosgene was bubbled in under the surface over about 1.5 to 2.0 hours. Addition of phosgene was continued until examination of sample on IR showed essentially all absorption due to the hydroxyl group was eliminated.

(b) To a beaker equipped with agitator, two dropping funnels, thermometer and a pH meter were charged 400 ml. water and 117 gm. diethyl propylene diamine (0.9 mole). These materials were agitated at room temperature while 300 gm. of the chlorocarbonate (0.9 mol) prepared in (a) and 30% NaOH were dropped in simultaneously over about 1 to 1.5 hours at such a rate as to maintain the pH between 10.0 to 10.5. A total of 127 gm. 30% NaOH was required. After all reactants were added the batch was agitated 15 minutes at room temperature and then brought to pH 9.0 with CP HCl. A total of 19 gm. were required. The product was then stripped of water at 40 mm. pressure and the residue was filtered. The yield was 336 gm. (82% of theory).

(c) To a 1 liter 4 necked flask with joints clamped for slight pressure were charged 277 gm. (0.6 mol) of the above carbamate, 200 ml. H₂O and 160 gm. 48% HBr to bring pH to 3.0 to 3.5. Materials were agitated at 50–60° C. and purged with N₂. Ethylene oxide (30 from cylinder) were added. A total of 20 gm. were absorbed.

The product was stripped to 110° C. pot temperature at 20 mm. vacuum and then filtered. The product contained 4.5% nitrogen by analysis.

The product generally corresponds to the formula:

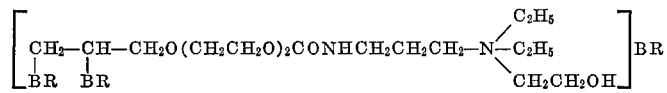

(d) The quaternary formed above was applied from MeOH/CCl₄ (520 ml./1000 ml.) solvent mixture to Orlon and polypropylene swatches at 2.50% application rate according to AATCC Standard Test Method 76–1959.

The swatches were conditioned at 72° F. and 50% relative humidity for at least 24 hours and the resistivity measured. Results were as follows:

|  | Log ohms/square | |
| --- | --- | --- |
|  | Orlon | Polypropylene |
| Control | 14.24 | 14.64 |
| Quaternary carbamate | 8.29 | 8.76 |

EXAMPLE 4

(a) To a round bottom flask was charged a total of 603 parts by weight of an ethoxylate (av. app. 10 moles E.O.) of 2,4-dichlorophenol. The ethoxylate was agitated at ambient temperature (20–30° C.) while phosgene was bubbled in under the surface over about 1.5 to 2.0 hours. Addition of phosgene was continued until examination of sample on IR showed essentially all absorption due to the hydroxyl group was eliminated.

(b) To a beaker equipped with agitator, two dropping funnels, thermometer and a pH meter were charged 200 ml. water and 51 gm. dimethyl propylene diamine (0.5 mole). These materials were agitated at room temperature while 332 gm. of the chlorocarbonate (0.5 mol) prepared in (a) and 30% NaOH were dropped in simultaneously over about 1 to 1.5 hours at such a rate as to maintain the pH between 10.0 to 10.5. A total of 70 gm. 30% NaOH was required. After all reactants were added the batch was agitated 15 minutes at room temperature and then brought to pH 9.0 with CP HCl. The product was then stripped of water at 40 mm. pressure and the residue was filtered to yield 331 g. (90.6% of theory) of carbamate.

(c) To a 1 liter 4 necked flask with joints clamped for slight pressure were charged 219 gm. (0.3 mol) of the above carbamate, 100 ml. H₂O and 45 gm. CP HCl to bring pH to 3.0 to 3.5. Materials were agitated at 50–60° C. and purged with N₂. Ethylene oxide was added. A total of 10 gm. were absorbed.

The product was stripped to 100° C. pot temperature under line vacuum and then filtered. The weight of the final product was 198 gm.

Percent nitrogen=3.3; calculated (percent) N=3.4.

The product generally corresponds to the formula:

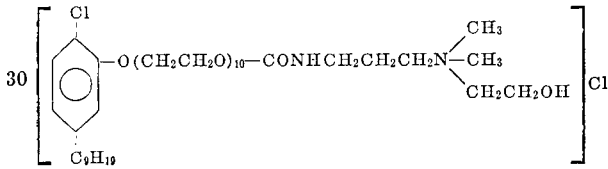

(d) The quaternary formed above was applied from MeOH/CCl₄ (520 ml./1000 ml.) solvent mixture to Orlon and polypropylene swatches at 2.50% application rate according to AATCC Standard Test Method 76–1959.

The swatches were conditioned at 72° F. and 50% relative humidity for at least 24 hours and the resistivity measured. Results were as follows:

|  | Log ohms/square | |
| --- | --- | --- |
|  | Orlon | Polypropylene |
| Control | 14.24 | 14.64 |
| Quaternary carbamate | 8.39 | 9.21 |

EXAMPLE 5

(a) To a round bottom flask was charged a total of 299.5 parts by weight of an ethoxylate (1.0 mole E.O.) of o-chloro-p-nonylphenol. The ethoxylate was agitated at ambient temperature (20–30° C.) while phosgene was bubbled in under the surface over about 1.5 to 2.0 hours. Addition of phosgene was continued until examination of sample on IR showed essentially all absorption due to the hydroxyl group was eliminated.

(b) To a beaker equipped with agitator, two dropping funnels, thermometer and a pH meter were charged 400 ml. water and 91 gm. dimethyl propylene diamine (0.9 mole). These materials were agitated at room temperature while 325 gm. of the chlorocarbonate (0.9 mol) prepared in (a) and 30% NaOH were dropped in simultaneously over about 1 to 1.5 hours at such a rate as to maintain the pH between 10.0 to 10.5. A total of 130 gm. 30% NaOH was required. After all reactants were added the batch was agitated 15 minutes at room temperature and then brought to pH 9.0 with CP HCl. The product was then stripped of water at 40 mm. pressure and the residue was filtered to yield 360 g. (93% of theoretical) of carbamate.

(c) To a 1 liter 4 necked flask with joints clamped for slight pressure were charged 256 gm. (0.6 mol) of the above carbamate, 200 ml. H₂O and 94 gm. CP HCl to bring pH to 3.0 to 3.5. Materials were agitated at 50–60° C. and purged with N₂. Ethylene oxide was added until a total of 27 gm. was absorbed.

The product was stripped to 110° C. pot temperature under line vacuum and then filtered. The product, 292 gm., analyzed 5.3% nitrogen.

The product generally corresponds to the formula:

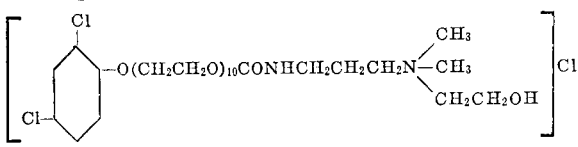

(d) The quaternary formed above was applied from MeOH/CCl₄ (520 ml./1000 ml.) solvent mixture to Orlon and polypropylene swatches at 2.50% application rate according to AATCC Standard Test Method 76–1959.

The swatches were conditioned at 72° F. and 50% relative humidity for at least 24 hours and the resistivity measured. Results were as follows:

|  | Log ohms/square | |
| --- | --- | --- |
|  | Orlon | Polypropylene |
| Control | 14.24 | 14.64 |
| Quaternary carbamate | 8.28 | 9.31 |

EXAMPLE 6

(a) To a round bottom flask was charged a total of 75.2 parts by weight of an ethoxylate (av. app. 5.0 moles E.O.) of 1H, 1H, 11H-eicosafluoro-1-undecanol. The ethoxylate was agitated at ambient temperature (20–30° C.) while phosgene was bubbled in under the surface over about 1.5 to 2.0 hours. Addition of phosgene was continued until examination of sample on IR showed essentially all absorption due to the hydroxyl group was eliminated.

(b) To a beaker equipped with agitator, two dropping funnels, thermometer and a pH meter were charged 40 ml. water and 9.1 gm. dimethyl propylene diamine (0.09 mole). These materials were agitated at room temperature while 73.2 gm. of the chlorocarbonate (0.09 mol) prepared in (a) and 30% NaOH were dropped in simultaneously over about 1 to 1.5 hours at such a rate as to maintain the pH between 10.0 to 10.5. A total of 15 gm. 30% NaOH was required. After all reactants were added the batch was agitated 15 minutes at room temperature and then brought to pH 9.0 with CP HCl. The product was then stripped of water at 40 mm. pressure and the residue was filtered to yield 74 g. (94% of theory) of carbamate.

(c) To a 1 liter 4 necked flask with joints clamped for slight pressure were charged 44.0 gm. (0.05 mol) of the above carbamate, 50 ml. H₂O and 7 gm. CP HCl to bring pH to 3.0 to 3.5. Materials were agitated at 50–60° C. and purged with N₂. Ethylene oxide was added until a total of 3 gm. were absorbed.

The product was stripped to 110° C. pot temperature under line vacuum and then filtered. The product, 50 gm., was found to contain 2.8% nitrogen by analysis.

The product generally corresponds to the formula:

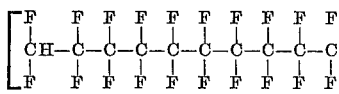

(d) The quaternary formed above was applied from MeOH/CCl₄ (520 ml./1000 ml.) solvent mixture to Orlon and polypropylene swatches at 2.50% application rate according to AATOC Standard Test Method 76–1959.

The swatches were conditioned at 72° F. and 40% relative humidity for at least 24 hours and the resistivity measured. Results were as follows:

|  | Log ohms/square | |
|---|---|---|
|  | Orlon | Polypropylene |
| Control | 14.24 | 14.64 |
| Quaternary carbamate | 8.92 | 10.47 |

While certain preferred embodiments of the present invention have been shown by way of specific example, it is to be understood that the present invention is in no way to be deemed as limited thereto but should be construed as broadly as all or any equivalents thereof.

What is claimed is:

1. An antistatic agent of the formula:

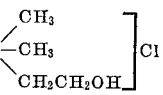

wherein R is selected from the group consisting of alkyl, aryl and alkaryl radicals containing from 2 to about 18 carbon atoms, X is selected from the group consisting of chlorine, bromine and fluorine atoms, Y is selected from the group consisting of hydrogen, methyl and ethyl, $n$ has an average value from 1 to 10, $R_1$ and $R_2$ are members selected from the group consisting of alkyl and hydroxyalkyl radicals having 1–3 carbon atoms, $R_3$ is a hydroxyalkyl radical having from about 1–4 carbon atoms, Z is an anion and $m$ is an integer from 1–37.

2. An antistatic agent of the formula:

3. An antistatic agent of the formula:

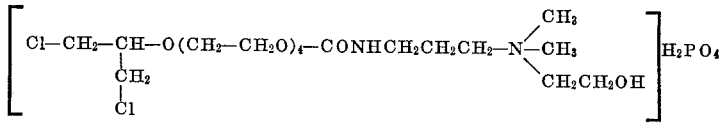

4. An antistatic agent of the formula:

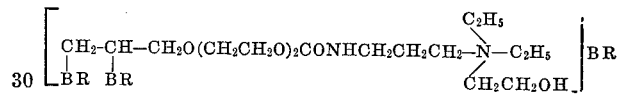

5. An antistatic agent of the formula:

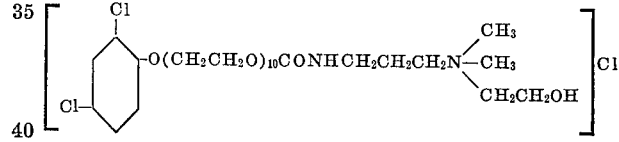

6. An antistatic agent of the formula:

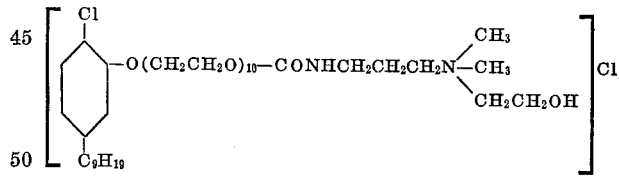

7. An antistatic agent of the formula:

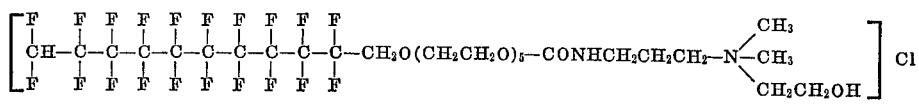

References Cited

UNITED STATES PATENTS 1,527,868  2/1925  Hartmann et al. _____ 260—482C

FOREIGN PATENTS 1,196,640  7/1965  Germany _____ 260—482C

LORRAINE A. WEINBERGER, Primary Examiner

P. J. KILLOS, Assistant Examiner

U.S. Cl. X.R.

117—139.5; 260—463